(12) United States Patent
Clampitt, Jr. et al.

(10) Patent No.: US 7,325,469 B1
(45) Date of Patent: Feb. 5, 2008

(54) CO-EXTRUDED SCREWDRIVER

(75) Inventors: Jess Vernon Clampitt, Jr., Hayesville, NC (US); Benjamin E. Orr, Monument, CO (US); Jackie D. Stewart, Hayesville, NC (US); Douglas S. McKittrick, Colorado Springs, CO (US)

(73) Assignee: W Forge Holdings, Inc., Colorado Springs, CO (US)

( * ) Notice: Subject to any disclaimer, the term of this patent is extended or adjusted under 35 U.S.C. 154(b) by 0 days.

(21) Appl. No.: 11/552,465

(22) Filed: Oct. 24, 2006

(51) Int. Cl.
*B25B 15/00* (2006.01)
*B25G 3/00* (2006.01)
*B25B 23/16* (2006.01)
*B25G 1/00* (2006.01)

(52) U.S. Cl. .......................... 81/436; 81/489
(58) Field of Classification Search ................. 81/436, 81/427.5, 177.1, 489, DIG. 5
See application file for complete search history.

(56) References Cited

U.S. PATENT DOCUMENTS

| | | | | |
|---|---|---|---|---|
| 4,934,024 A | * | 6/1990 | Sexton, I | 16/421 |
| 5,155,878 A | * | 10/1992 | Dellis | 16/421 |
| 5,259,277 A | * | 11/1993 | Zurbuchen | 81/177.1 |
| 5,341,707 A | * | 8/1994 | Bond | 81/436 |
| 5,361,654 A | * | 11/1994 | Rasipovits | 81/64 |
| 5,421,224 A | * | 6/1995 | Bond | 81/436 |
| 5,601,003 A | * | 2/1997 | Amtenbrink et al. | 81/489 |
| 5,722,116 A | * | 3/1998 | Lin | 16/436 |
| 5,781,963 A | * | 7/1998 | Maru et al. | 16/430 |
| 6,094,781 A | * | 8/2000 | Jansson et al. | 16/431 |
| 6,122,802 A | * | 9/2000 | Lo | 16/431 |
| 6,148,482 A | * | 11/2000 | Maraman, Jr. | 16/421 |
| 2006/0016299 A1 | * | 1/2006 | Chen | 81/436 |

\* cited by examiner

*Primary Examiner*—David B Thomas
(74) *Attorney, Agent, or Firm*—Locke Lord Bissell & Liddell LLP

(57) ABSTRACT

The present disclosure provides a method, apparatus, and system to identify screwdrivers by characteristics without necessitating viewing the tips and/or shaft of the screwdrivers. The screwdriver handles can include a shaped structure within the handle corresponding to the identification of the characteristic. In some embodiments, the handle can be co-extruded so that an internal structure indicating the screwdriver characteristics can be extruded concurrently with the outside portion of the screwdriver handle, where the outside portion can be further shaped to form various gripping surfaces. At least a portion of the handle can be at least partially translucent to allow viewing of the internal structure through the handle for identification. The internal structure may also be viewed from one or both ends of the handle. The size or color of the internal structure can also identify characteristics of the screwdriver, such as the tip size, length, and other characteristics.

17 Claims, 8 Drawing Sheets

US 7,325,469 B1

CO-EXTRUDED SCREWDRIVER

CROSS REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO APPENDIX

Not applicable.

BACKGROUND

1. Field of the Invention

The invention relates to hand tools. More specifically, the invention relates to screwdrivers.

2. Description of Related Art

Screwdrivers are ubiquitous to almost any trade, do-it-yourself person, and homemaker. The assortments, types, and shaft widths and lengths vary widely. Persons with a significant number of screwdrivers can have difficulty locating the particular screwdriver to be used until the tip is found amidst other tools and items in a typical toolbox.

It would be advantageous to have designators attached to the screwdrivers for easy identification. Some screwdrivers provide such identification through textual labeling, such "#2 Phillips", "15 Torx®" or "T15", "Slotted" and other labels. Other screwdrivers have color coding on the handle, where a blue line or lines might indicate a Phillips type and red might indicate a slotted type. However, such marking can wear or become discolored and be difficult to read, or even obscured on the handles with paint, all of which cause impediments to the intended purpose of easy identification.

Thus, there remains a need for an improved identification of types of screwdrivers.

BRIEF SUMMARY

The present disclosure provides a method, apparatus, and system to identify screwdrivers by characteristics without necessitating viewing the tips and/or shaft of the screwdrivers. The screwdriver handles can include a shaped structure within the handle corresponding to the identification of the characteristic. In some embodiments, the handle can be co-extruded so that an internal structure indicating the screwdriver characteristics can be extruded concurrently with the outside portion of the screwdriver handle, where the outside portion can be further shaped to form gripping surfaces. At least a portion of the handle can be at least partially translucent to allow viewing of the internal structure through the handle for identification. The internal structure may also be viewed from one or both ends of the handle. The size or color of the internal structure can also identify characteristics of the screwdriver, such as the tip size, length, and other characteristics.

The disclosure provides a screwdriver, comprising: a shaft with a tip; and a handle coupled with the shaft, comprising: an outer portion; and an inner structure formed within the outer portion, the inner structure being an identifier of at least one characteristic of the screwdriver.

The disclosure provides a method of forming a handle of a screwdriver having an outer portion at least partially surrounding an inner structure formed in the handle, comprising: providing a first material for the outer portion to an extruder; providing a second material for the inner structure to the extruder; flowing the first material through an outer portion die to form the outer portion; and flowing the second material through an inner structure die to form the inner structure within the outer portion, and forming the inner structure to identify a characteristic of the screwdriver.

BRIEF DESCRIPTION OF THE DRAWINGS

While the concepts provided herein are susceptible to various modifications and alternative forms, only a few specific embodiments have been shown by way of example in the drawings and are described in detail below. The figures and detailed descriptions of these specific embodiments are not intended to limit the breadth or scope of the concepts or the appended claims in any manner. Rather, the figures and detailed written descriptions are provided to illustrate the concepts to a person of ordinary skill in the art as required by 35 U.S.C. § 112.

DETAILED DESCRIPTION

One or more illustrative embodiments of the concepts disclosed herein are presented below. Not all features of an actual implementation are described or shown in this application for the sake of clarity. It is understood that the development of an actual embodiment, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1:
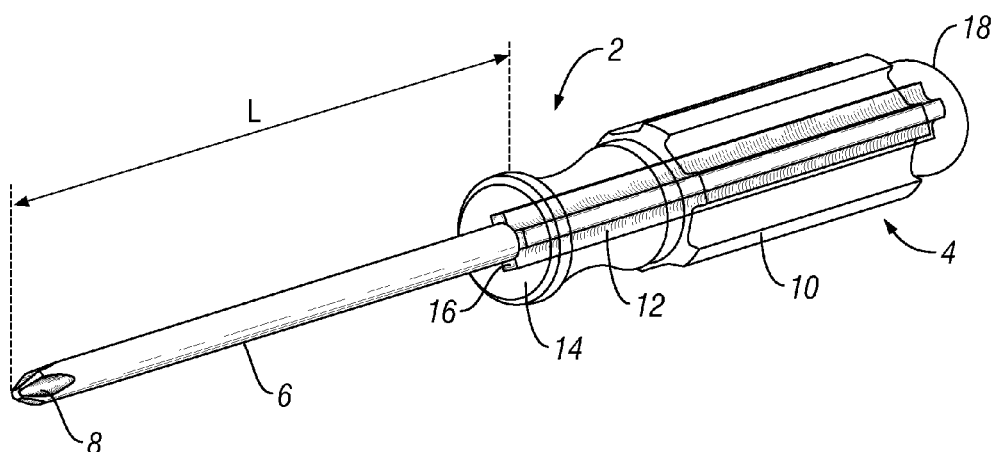
FIG. 1 is a schematic perspective view of one embodiment of the screwdriver showing an identifier viewed from a tip end.

FIG. 1 is a schematic perspective view of one embodiment of the screwdriver showing an identifier viewed from a tip end. The screwdriver 2 generally includes a handle 4 with a shaft 6 coupled thereto. The shaft 6 generally includes a tip 8 at an end of the shaft. The shaft 6 can have a variety of lengths designated as "L". For example and without limitation, the length of the shaft 6 can range from about one inch to more than 12 inches, and other lengths are possible. The tip 8 can be of any customary type of screwdrivers, including Phillips, slotted, Torx®, square, nutdrivers, and others. As used herein, the term screwdriver is intended to be given a broad scope and can include any type of tip or size that can be coupled to a screwdriver type handle, whether the actual item to be manipulated is a screw, bolt, nut, pin, rivet, or other device. Further, the tip 8 can include any custom shapes as might be particular to a specialty field.

The handle 4 generally includes at least two portions, an outer portion 10 and an inner structure 12. The outer portion 10 in at least some embodiments can be at least partially translucent to view the inner structure 12. It is the intent that at least a portion of the inner structure be viewed from some portion of the outer portion 10 of the handle. The viewing could be through the side of the handle outer portion 10 or through one of its ends, such as a shaft end 14 of the handle adjacent to the shaft or a distal end 18 of the handle, distal from the shaft, or a combination thereof. The inner structure 12 can serve as an indicator for the type of tip 8, the size of the tip, the length of the shaft 6, or other characteristics as may be appropriate.

Figure 2:
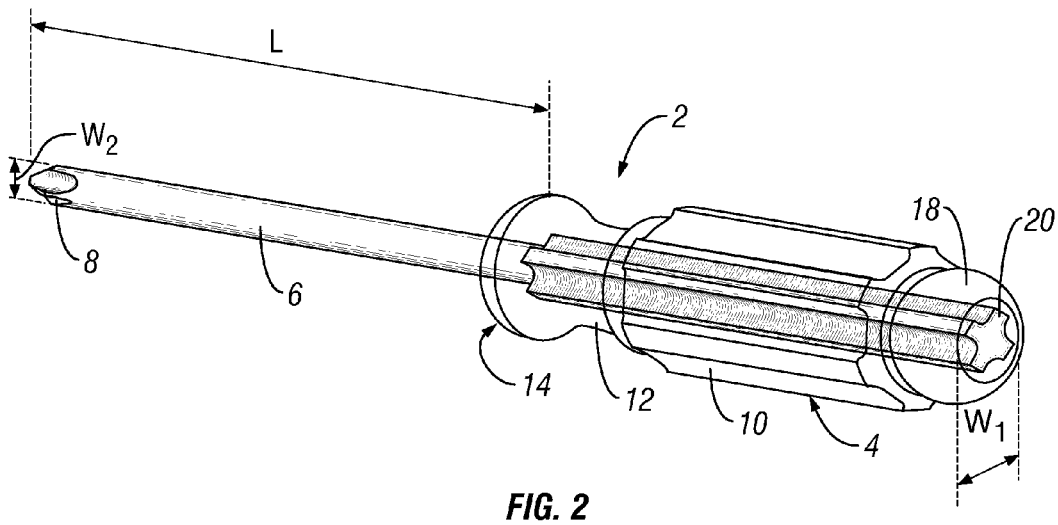
FIG. 2 is a schematic perspective view of the screwdriver of FIG. 1 viewed from a distal end.

FIG. 2 is a schematic perspective view of the screwdriver FIG. 1 viewed from a distal end. As described above, the screwdriver 2 generally includes a handle 4 with an outer portion 10 and an inner structure 12. The screwdriver 12 further includes a shaft 6 with a tip 8, the shaft having a length L. As seen in FIG. 2, the inner structure 12 can be viewed from a distal end 18 along the face 20. In at least one embodiment, the shape of the indicator of the inner structure 12 can indicate the shape of the tip 8. This characteristic is seen, for example, in the face 20 that indicates a Phillips tip in this particular embodiment, although other shapes can be used.

Another characteristic of the screwdriver 2 that can be indicated with the inner structure 12 is the size of the tip 8. For example, if the size of the tip 8 has a dimension of "$W_2$", which could be a diameter in some tips, the size of the inner structure 12 could be some relative dimension of "$W_1$". Further, if the tip 8 is provided in various sizes from smaller or larger dimensions of $W_2$, the size of the inner structure 12 could vary as well to indicate a smaller or larger tip sizes.

The inner structure can also be used to indicate other characteristics. For example, another characteristic that can be indicated by the inner structure 12 is the length of the shaft 6. As one example of an indicator, the inner structure 12 can be colored a particular color that will indicate a standard length of a particular set of screwdrivers.

The above three indicators of shape, size, and color are only three examples of various indicators that can be used from a single inner structure 12 to indicate one or more characteristics of the particular screwdriver or screwdrivers. Other variations could include combinations of characteristics indicated by the inner structure 12 in conjunction with the outer portion 10 and are to be included within the scope of the claims herein. Other variations of the inner structure 12 can be made. For example, the inner structure 12 can comprise a plurality of substructures adjacent to each other or separated from each other by a distance, so that a plurality of elongated members collectively forms an inner structure. The plurality of indicia of the inner structure can be used to indicate a plurality of characteristics of the screwdriver 2. Further, a plurality of indicia can be used to indicate a single characteristic of the screwdriver. For example, an identifying color and shape of the inner structure 12 can be used to identify a particular type of shaft tip as duplicate indicators.

Figure 3:
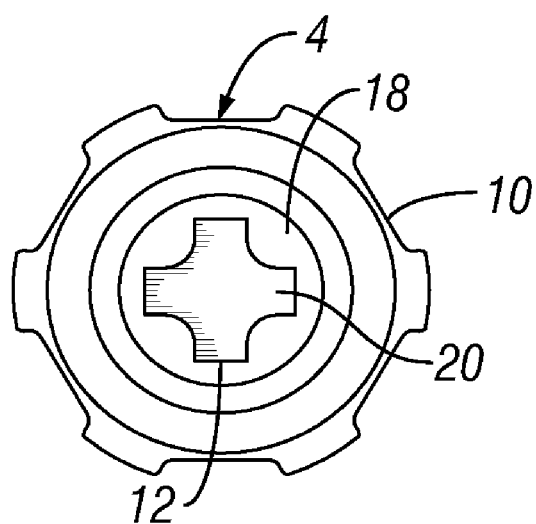
FIG. 3 is an end schematic view of the screwdriver of FIG. 1 viewed from the distal end.

FIG. 3 is an end schematic view of the screwdriver of FIG. 1 viewed from the distal end. The handle 4 includes an outer portion 10 and an inner structure 12. In at least one embodiment, the inner structure 12 can form a portion of the face 20 on the distal end 18 of the handle 4. Thus, the face 20 can be viewed by an operator or other person to identify characteristics of the screwdriver without having to necessarily view the shaft 6, the tip 8, or a combination thereof. For example and without any limitation, the shape of the inner structure as a plus symbol "+" can be used to correspond to a Phillips type of tip.

Figure 4:
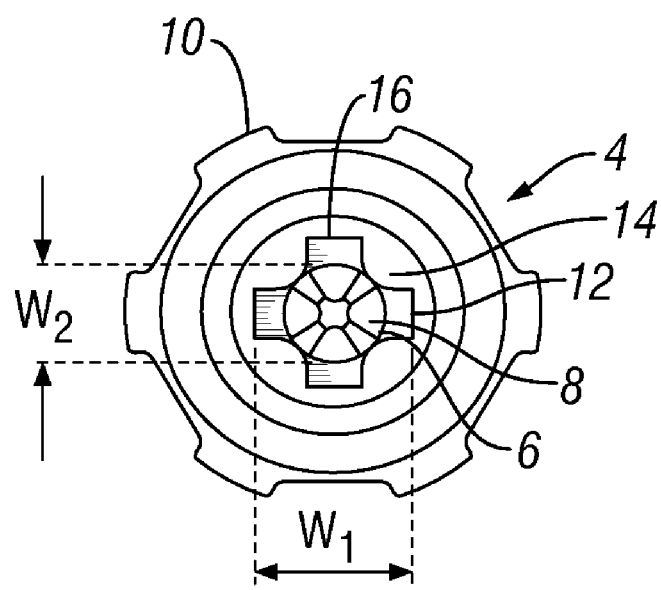
FIG. 4 is an end schematic view of the screwdriver of FIG. 1 viewed from the tip end.

FIG. 4 is an end schematic view of the screwdriver FIG. 1 viewed from the tip end. The handle 4 generally includes the outer portion 10 and the inner structure 12. In at least one embodiment, the inner structure 12 can also be viewed at the shaft end 14. Thus, the inner structure 12 can form a portion of the face 16 of the shaft end 14. Further, the orientation of the tip 8 can vary relative to the inner structure 12, and the orientation shown in Figures herein are merely exemplary. Further, the size $W_1$ of the inner structure 12 can vary in at least one embodiment with the size $W_2$ of the tip 8.

Figure 5:
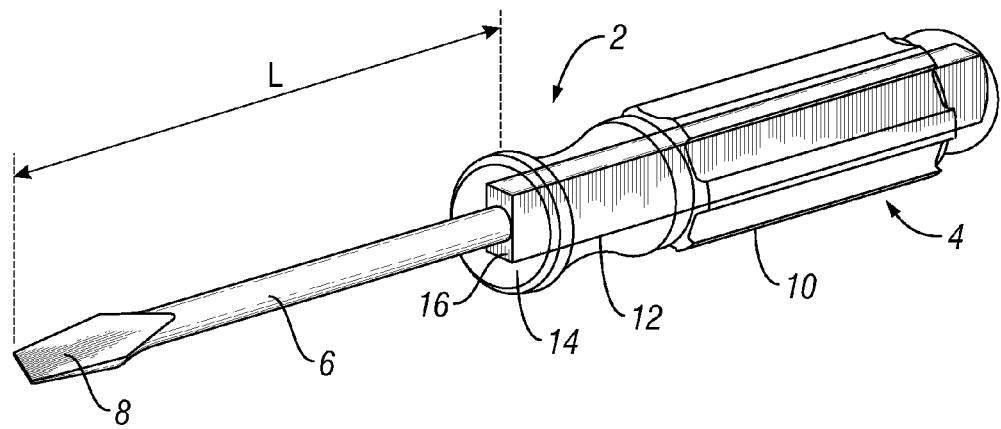
FIG. 5 is a schematic perspective view of another embodiment of a screwdriver with an indicator viewed from a tip end.
Figure 6:
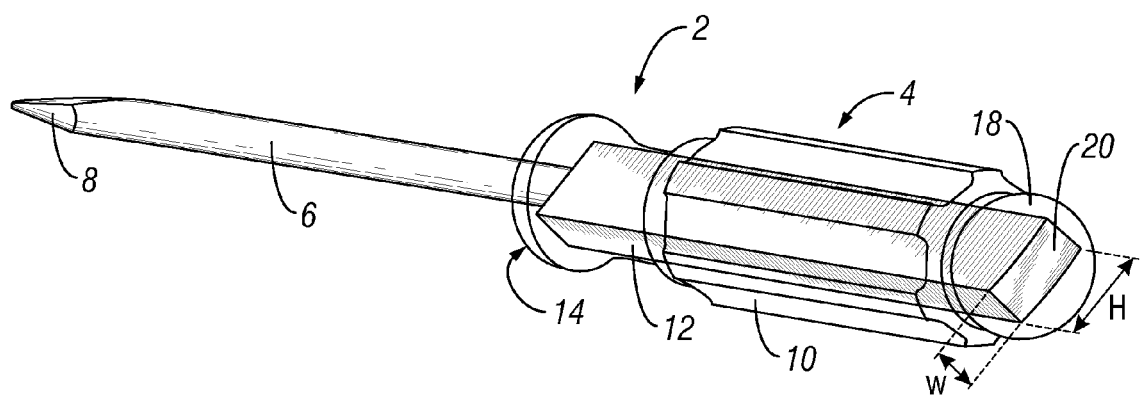
FIG. 6 is a schematic perspective view of the screwdriver of FIG. 5 viewed from a distal end.
Figure 7:
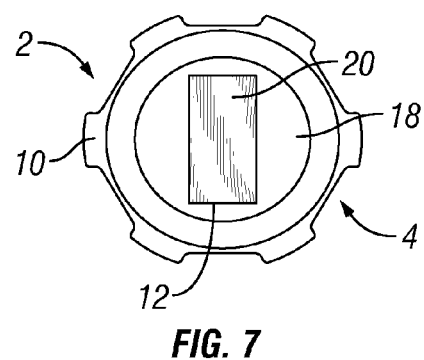
FIG. 7 is an end view of the screwdriver of FIG. 5 viewed from the distal end.

FIG. 5 is a schematic perspective view of another embodiment of a screwdriver with an indicator viewed from a tip end. FIG. 6 is a schematic perspective view of the screwdriver of FIG. 5 viewed from a distal end. FIG. 7 is an end view of the screwdriver of FIG. 5 viewed from the distal end. FIGS. 5, 6, and 7 will be described in conjunction with each other. Similar elements are similarly numbered as shown in FIGS. 1-4. In the illustrated embodiment, the inner structure 12 can be varied in shape to indicate a characteristic of the screwdriver. In this particular embodiment, the inner structure 12 shape is rectangular to correspond to a rectangular shaped tip 8, generally referred to as a "slotted" or "flat blade" screwdriver. As described above, the inner structure 12 can be varied to indicate other characteristics in addition to or in lieu of the shaft shape. Because this embodiment has a rectangular shaped inner structure 12, the size W as a width dimension and the height H as a cross dimension to W can be used to describe a cross-section of the inner structure 12. The dimensions W and H can be varied to indicate other or further characteristics of the screwdriver, such as the size of the tip 8, the shaft L, and other characteristics of the screwdriver 2. As described above, other indicia, such as color, can be used to indicate various characteristics in addition to or in lieu of other indicia. The blade orientation relative to the inner structure can vary and the one shown in only exemplary. Further, as similarly described above, the inner structure 12 can be viewed from the outer portion 10, such as through at least a portion of the side of the outer portion 10, through the face 16 of the shaft end 14, through the face 20 of the distal end 18, or some combination thereof.

Figure 8:
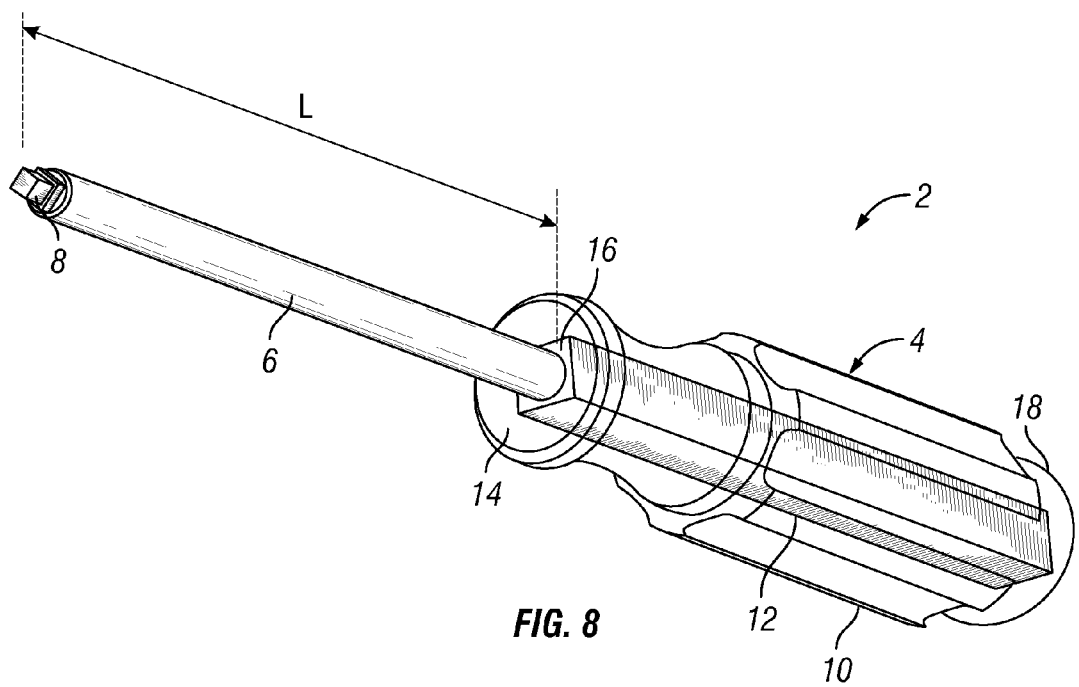
FIG. 8 is a schematic perspective view of another embodiment of the screwdriver with an indicator viewed from a tip end.
Figure 9:
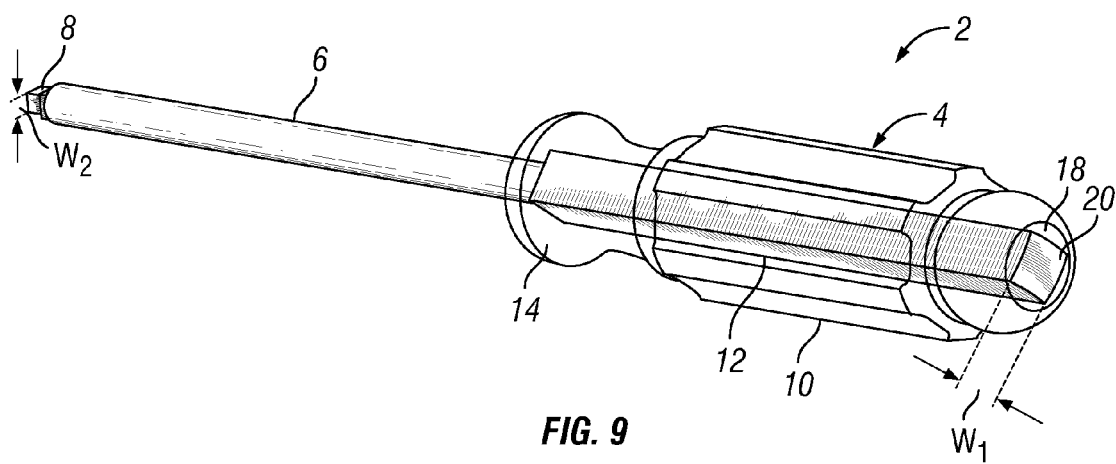
FIG. 9 is a schematic perspective view of the screwdriver of FIG. 8 viewed from a distal end.
Figure 10:
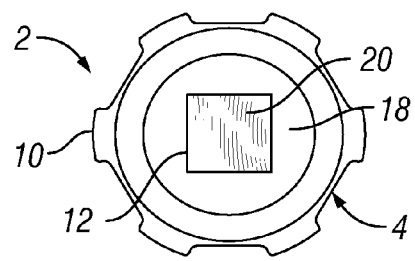
FIG. 10 is an end schematic view of the screwdriver of FIG. 8 viewed from the distal end.

FIG. 8 is a schematic perspective view of another embodiment of the screwdriver with an indicator viewed from a tip end. FIG. 9 is a schematic perspective view of the screwdriver of FIG. 8 viewed from a distal end. FIG. 10 is an end schematic view of the screwdriver of FIG. 8 viewed from the distal end. These figures will be described in conjunction with each other. The shaft tip 8 represents yet another generally accepted tip type known as a square drive. The shaft tips or square drives can come in a variety of sizes. It is similar to the embodiment shown in FIGS. 5-7 except that it is square. Naturally, other variations can occur and the exemplary embodiment is only representative of one variation. Further, the orientation of the tip 8 can vary relative to the orientation of the inner structure 12 as has been described above with the other embodiments. The elements are described with similar numbers as had been referenced above. The screwdriver 2 includes a handle 4 having an outer portion 10 and an inner structure 12. The handle 4 is generally coupled to a shaft 6 having a tip 8. The inner structure 12 can be formed into a variety of shapes, sizes, colors, and other indicia. The various shapes, sizes, colors, and other indicia can be used to indicate various characteristics of the screwdriver 2. For example, without limitation, the shape of the inner structure 12 can indicate the type of the tip 8. The size "$W_1$" of a cross-section of the inner structure 12 can indicate a relative size "$W_2$" of the tip 8. The color of the inner structure 12 can indicate yet another feature in addition to or in lieu of other indicia of the inner structure 12 for one or more characteristics of the screwdriver 2. The inner structure 12 can be viewed through the side of the handle's outer portion 10, the shaft end 14, the distal end 18, or a combination thereof.

Figure 11:
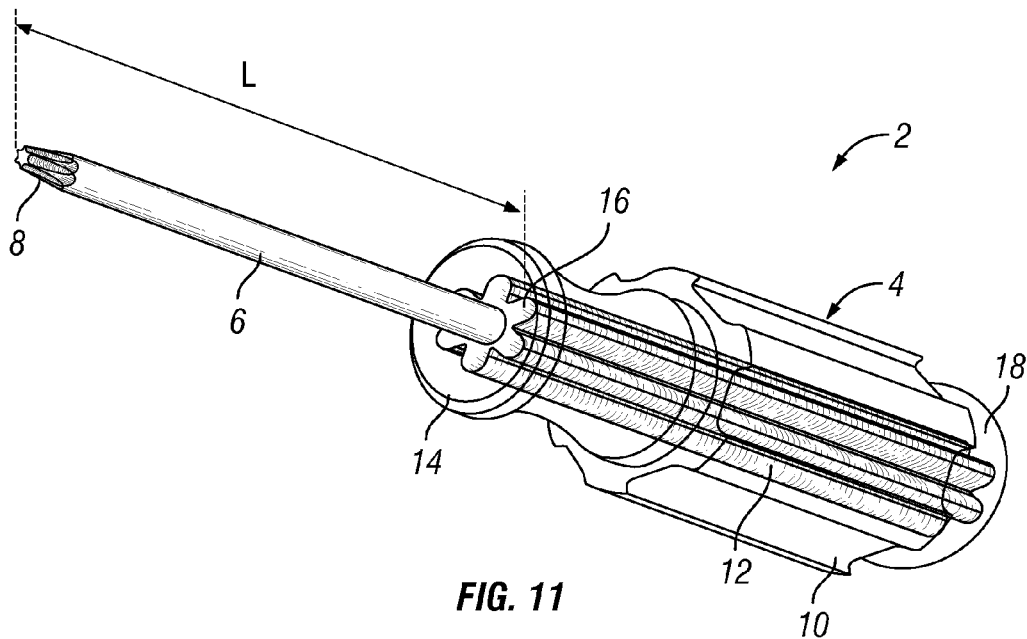
FIG. 11 is a schematic perspective view of another embodiment of a screwdriver with an indicator viewed from a tip end.
Figure 12:
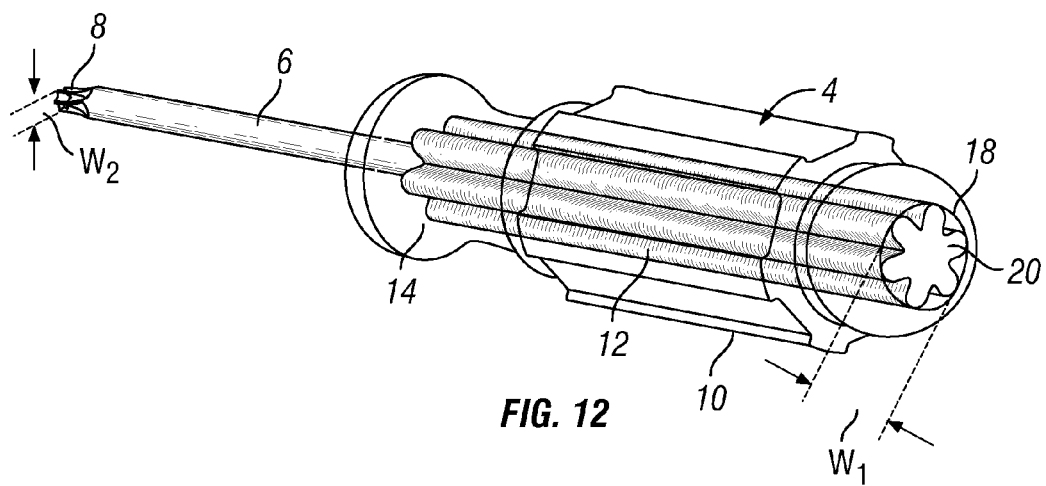
FIG. 12 is a schematic perspective view of a screwdriver of FIG. 11 viewed from a distal end.
Figure 13:
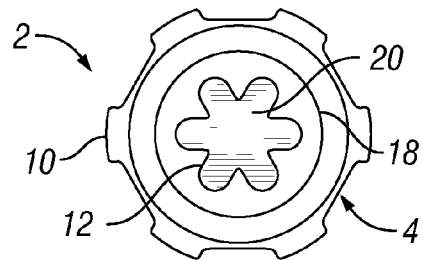
FIG. 13 is an end schematic view of the screwdriver of FIG. 11 viewed from the distal end.

FIG. 11 is a schematic perspective view of another embodiment of a screwdriver with an indicator viewed from a tip end. FIG. 12 is a schematic perspective view of a screwdriver in FIG. 11 viewed from a distal end. FIG. 13 is an end schematic view of the screwdriver of FIG. 11 viewed from the distal end. The figures will be described in conjunction with each other. These figures represent yet another type of shaft tip commonly known as a Torx® type. Torx® tips also come in various sizes generally labeled with a number, such a 10, 15, 20, 25, 30, 35, 40, 45 and other sizes. The screwdriver 2 can include one or more of the elements described above and are similarly numbered. The screwdriver 2 generally includes the handle 4 having an outer portion 10 and an inner structure 12 that is coupled to the shaft 6 having a tip 8. As in the other embodiments, the inner structure 12 can extend through at least a portion of the handle 4. As described above, the other inner structure 12 can also be varied to correspond to a size of the tip 8. Similarly, the color of at least the inner structure 12 can be varied to indicate one or more characteristics of the screwdriver.

In producing the screwdriver, the handle 4 is generally at least partially formed by an extrusion process. As is known in the field, an extrusion process takes a quantity of material at a moldable temperature and presses the material through a set of dies, so that the material is extruded therethrough.

The dies are shaped to produce an end product or near end product that requires generally less finishing than without the extrusion process. In general, the inner structure 12 can be extruded into a desired shape through a die and the outer portion 10 can be extruded through a separate, larger die, as an extrusion around the inner structure 12. The resulting "extruded" product as a bar can be cut and sized to appropriate lengths with any finish work, such as machining a diameter toward the shaft end or a radius on the distal end, and other finishing procedures as is generally performed for screwdriver handles. The result is that the inner structure 12 is formed within the outer portion 10 and can be viewed from the handle outer portion 10.

In at least one embodiment, the screwdriver handle 4 can be formed in a co-extrusion process. The inner structure 12 can be formed within the outer portion 10 at the time of extrusion of the outer portion 10. The term "co-extrusion", "co-extruded", and variations thereof will be used to indicate herein that the inner structure 12 is extruded concurrently with the extrusion of the outer portion 10. Alternatively, the inner structure 12 can be formed before or after the outer portion 10 is extruded.

The material can be any suitable wear resistant and durable material. For extrusion, the material can generally be a plastic synthetic or cellulose based product. Without limitation, one exemplary material comprises cellulose butyrate acetate. Such a material is resistant to shock from dropping and hammering on the handle, and is resistant to many household chemicals and solvents. Other materials include cellulose acetate, polyvinyl chloride (PVC), and other impact resistant materials. In some process, the outer portion is generally made of higher quality, more translucent materials from virgin raw material. Because the inner structure is composed of less translucent materials or opaque materials, a less expensive or more available material can be used including regrind materials.

Figure 14:
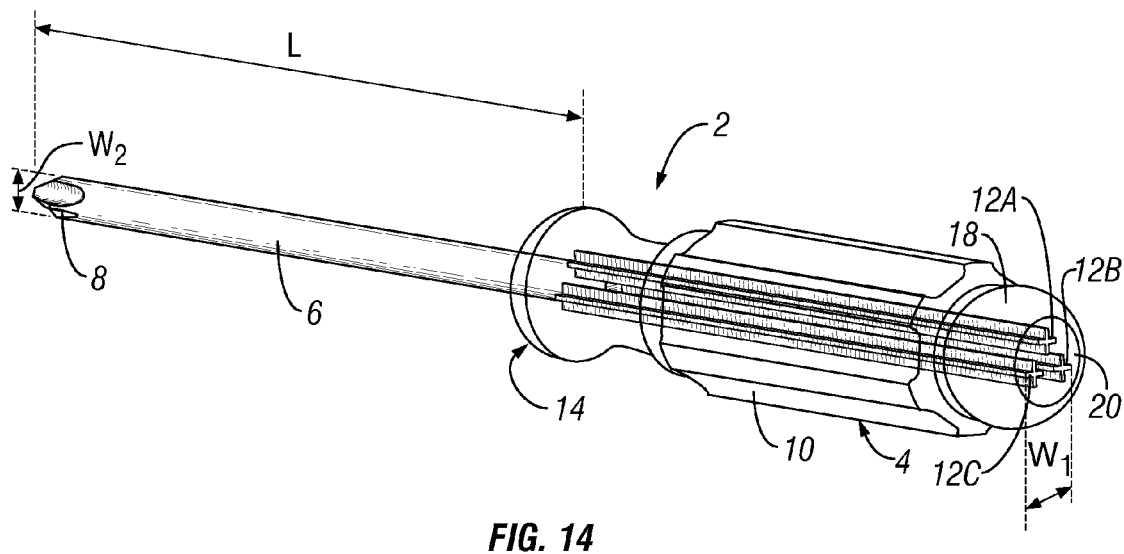
FIG. 14 is a schematic perspective view of another embodiment of a screwdriver viewed from a distal end.
Figure 15:
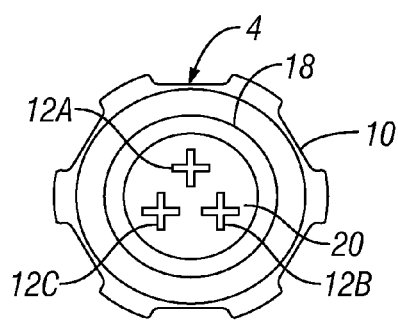
FIG. 15 is an end schematic view of the screwdriver of FIG. 14 viewed from the distal end.

FIG. 14 is a schematic perspective view of another embodiment of a screwdriver viewed from a distal end. FIG. 15 is an end schematic view of the screwdriver of FIG. 14 viewed from the distal end. The figures will be described in conjunction with each other. As mentioned above, the inner structure 12 can comprise a plurality of substructures, such as substructures 12A, 12B, 12C, adjacent to each other or separated from each other by a distance, so that a plurality of substructures collectively form the inner structure referenced herein. For example and without any limitation, the substructures can indicate a characteristic, such as the shape of the tip, size of the tip, length, or a combination thereof. In the exemplary embodiment, the substructures could represent a Phillips type of tip and the number of substructures could represent a size of the tip, such as a Phillips #3 size. Other nomenclature such as a Torx® "T15" or other such nomenclatures for different types of tips could be indicated by some pattern, size, color, spacing, or other indicia using the substructures. Further, the exemplary embodiment illustrates a similar shape of substructures. However, it is explicitly understood that dissimilar shapes or other indicia could be used to represent various selected characteristics.

Figure 16:
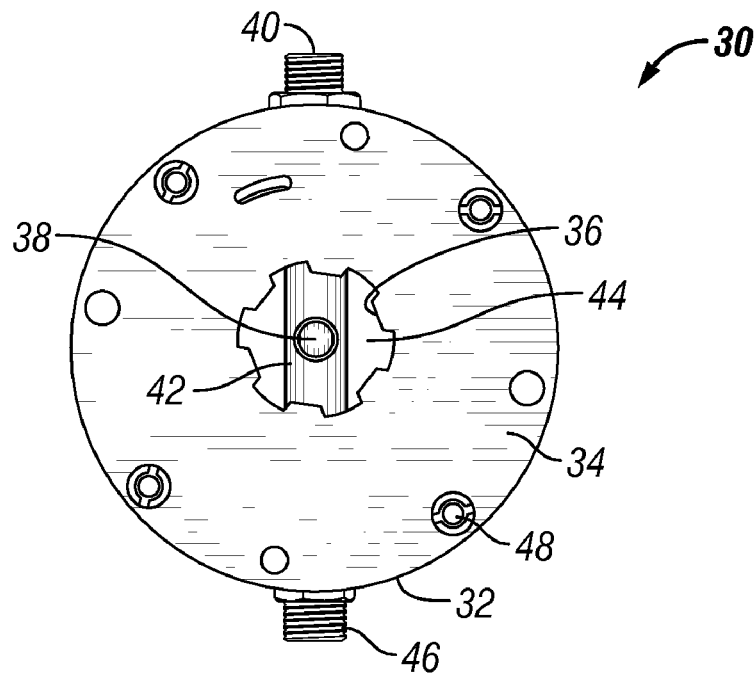
FIG. 16 is an end schematic view of an exemplary extrusion die assembly for extruding the handle.
Figure 17:
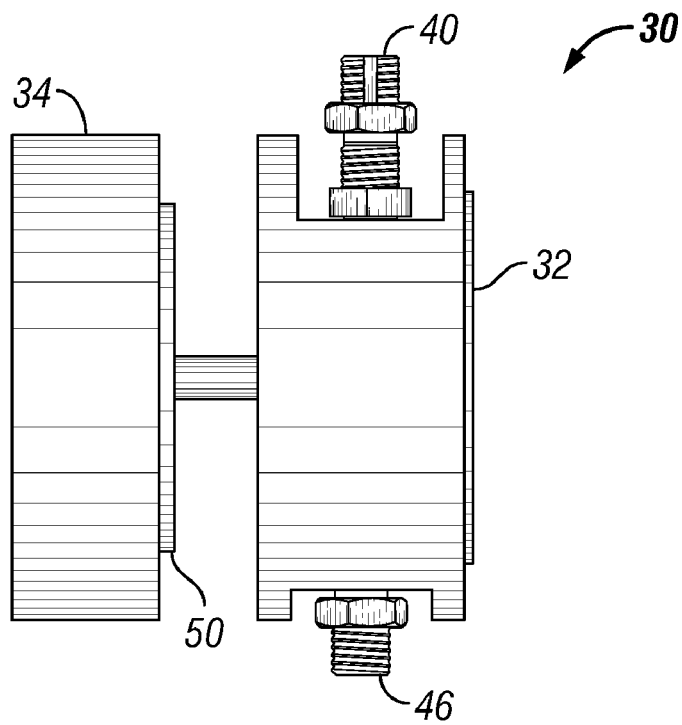
FIG. 17 is a side schematic view of an exemplary extrusion die assembly partially disassembled.
Figure 18:
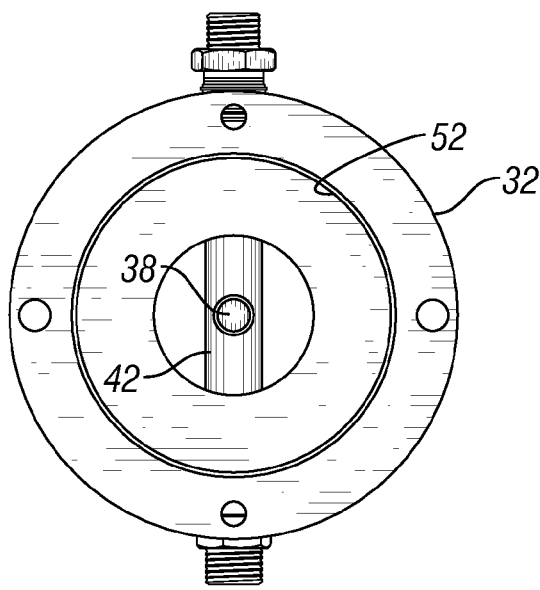
FIG. 18 is an end schematic diagram of an inner structure die of the exemplary extrusion die assembly

FIG. 16 is an end schematic view of an exemplary extrusion die assembly for extruding the handle. FIG. 17 is a side schematic view of an exemplary extrusion die assembly partially disassembled. FIG. 18 is an end schematic diagram of an inner structure die of the exemplary extrusion die assembly. The figures will be described in conjunction with each other.

The screwdriver handle described above can be formed using a die assembly 30. In at least one embodiment, the die assembly 30 generally includes an inner structure die 32 coupled to an outer portion die 34. The inner structure die 32 generally includes an inner structure opening 38. The opening 38 can have a cross-sectional shape corresponding to the particular cross-sectional shape of the inner structure 12 described above. If substructures are formed as described above, the die 32 can be divided into a plurality of dies to form the substructures into various predetermined shapes as desired. The outer portion die 34 generally includes an outer portion opening 36 with a cross-sectional shape corresponding to the outer surfaces of the handle outer portion 10 described above. Further, the outer portion die 34 can be coupled with the inner structure die 32 with one or more fasteners 48. To facilitate the appropriate alignment, a step 50 on the outer portion die 34 can be formed to engage a corresponding step 52 formed on the inner structure die 32.

The die assembly 30 generally includes two ports through which the handle material flows, so that the inner structure and outer portion can be formed. For example, the inner structure die 32 can have an inner structure inlet 40. Material for the inner structure can flow through an inner structure conduit 42, and out the inner structure opening 38 with the designated cross-sectional shape such as those shapes shown herein. A structural support 46 can help stabilize the conduit 42 as the outer portion material flows through the outer portion opening 36 and around the conduit 42 to form the outer portion of the handle described above.

Figure 19:
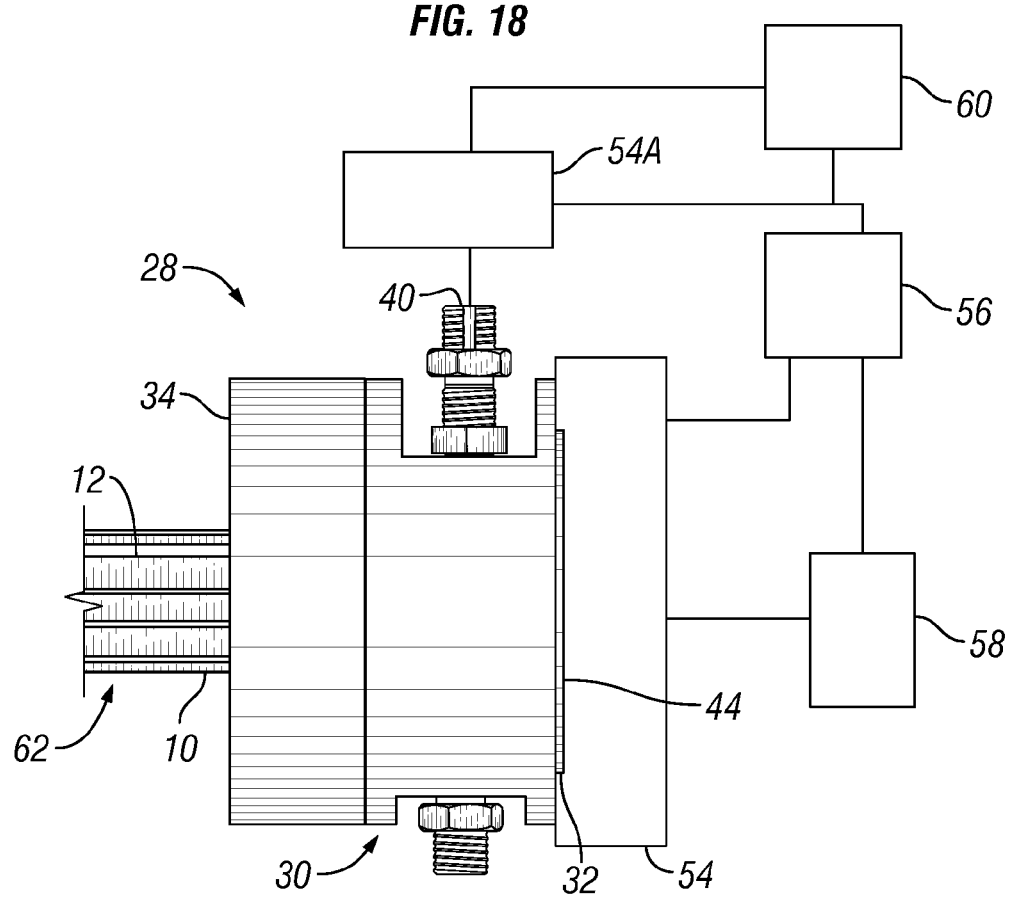
FIG. 19 is a schematic diagram of an exemplary extrusion die assembly system.

FIG. 19 is a schematic diagram of an exemplary extrusion die assembly system. The system 28 generally includes one or more extruders, a controller, a material supply for outer portion, and a material supply for the inner structure. More specifically, the system 28 generally includes an outer extruder 54 and an inner extruder 54A to which the die assembly 30 can be coupled thereto. The extruders can provide the various mechanisms, flow paths, valves, solenoids, processors and other control circuits, and other equipment that would be known to those with ordinary skill in the art, given the description disclosed herein. Without any limitation, an exemplary extruder can be an HPM PRODEX available from Taylor's Industrial Services, LLC in Mount Gilead, Ohio, USA or Berlyn Extruders, Inc. in Worchester, Massachusets, USA. Other extruders are available and suitable. The extruders are represented schematically as separate functions in FIG. 19, and can be separate physical units or physically coupled together, or even a single unit with for example double extrusion chambers. Generally, an extrusion function will be used for each of the outer portion and the inner structure, described above.

A controller 56 can be coupled to the extruders 54, 54A to control the various processes, safety interlocks, pressures, and sensors that are part of the extruders. An outer portion supply 58 can provide material to the outer extruder 54 and then to the die assembly 30 to be flowed through the opening 36 of the outer portion die 34 described above. The controller 56 can be also coupled to the outer portion supply 58 and the outer extruder 54 for controlling the temperature, pressures, and other parameters of the outer portion supply and outer extruder 54. Similarly, the inner structure supply 60 can provide material to the inner extruder 54A and then to the die assembly 30 to be flowed through the inner structure inlet 40 and out of the inner structure opening 38, described above. The controller 56 can also be coupled to the inner structure supply 60 and the inner extruder 54A for controlling the operation thereof.

In at least one embodiment, the controller can control the supplies and the extruders in such a way that the material from the supplies 58, 60 flow concurrently through the die assembly 30 to produce a co-extruded product 62. The co-extruded product generally will include the outer portion 10 of the handle described above with the inner structure 12 extruded through the inner portion. The material of the outer portion generally flows around the inner structure conduit 42 shown in FIGS. 14, 16 and over the inner structure opening 38 so that the product 62 solidifies thereafter into a continuous extruded product with the inner structure disposed within the outer portion. The product can be cut to length and finished.

The various methods and embodiments of the invention can be included in combination with each other to produce variations of the disclosed methods and embodiments, as would be understood by those with ordinary skill in the art, given the understanding provided herein. Also, various aspects of the embodiments could be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. The term "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion. The coupling can occur in any direction, including rotationally. Unless the context requires otherwise, the word "comprise" or variations such as "comprises" or "comprising", should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. Further, the order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention.

The invention has been described in the context of various embodiments and not every embodiment of the invention has been described. Apparent modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

Further, any references mentioned in the application for this patent as well as all references listed in the information disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicants.

The invention claimed is:

1. A screwdriver, comprising:
   a shaft with a tip; and
   a handle coupled with the shaft, comprising:
      an outer portion having a length; and
      an inner structure concurrently co-extruded within the outer portion, the inner structure being an identifier of at least one characteristic of the screwdriver, the inner structure being formed substantially the length of the outer portion.

2. The screwdriver of claim 1, wherein a cross-sectional shape of the inner structure establishes an identifier of a cross-sectional shape as the tip.

3. The screwdriver of claim 2, wherein the inner structure is colored and establishes another identifier of at least one characteristic of the screwdriver.

4. The screwdriver of claim 1, wherein the characteristic comprises a type of tip comprising Phillips, square, Torx, and slotted.

5. The screwdriver of claim 4, wherein a cross-sectional shape of the inner structure comprises a Phillips, square, Torx, and slotted shape corresponding to the tip.

6. The screwdriver of claim 1, wherein the characteristic comprises a size of tip of the screwdriver.

7. The screwdriver of claim 1, wherein the characteristic comprises a length of the screwdriver.

8. The screwdriver of claim 1, wherein the outer portion comprises at least a partially translucent material adapted to allow a user to see the inner structure inside the outer portion along at least a portion of the length of the outer portion.

9. The screwdriver of claim 1, wherein the inner structure is at least partially visible through a shaft end of the outer portion adjacent the shaft, a side of the outer portion, an end of the outer portion distal from the shaft end, or a combination thereof.

10. The screwdriver of claim 1, wherein the inner structure comprises a plurality of substructures.

11. The screwdriver of claim 10, wherein the combination of the substructures indicates at least one characteristic of the screwdriver.

12. A method of forming a handle of a screwdriver having an outer portion at least partially surrounding an inner structure formed in the handle, comprising:
   providing a first material for the outer portion to an extruder;
   providing a second material for the inner structure to the extruder;
   flowing the first material through an outer portion die to form the outer portion; and
   flowing the second material through an inner structure die to concurrently co-extrude the inner structure within the outer portion while forming the inner structure to identify a characteristic of the screwdriver.

13. The method of claim 12, wherein forming the inner structure comprises forming a shape of the inner structure to correspond to a shape of a tip of the screwdriver coupled to the handle.

14. The method of claim 12, wherein the characteristic comprises a size of a tip of the screwdriver coupled to the handle.

15. The method of claim 12, wherein the characteristic comprises a length of the screwdriver.

16. The method of claim 12, wherein the first material is different than the second material and the second material comprises at least partially regrind material.

17. The method of claim 12, further comprising flowing the first material around at least a portion of an inner structure die through which the second material flows and at least partially around the second material flowing from the inner structure die.

* * * * *